(12) United States Patent
Lin

(10) Patent No.: US 10,491,724 B2  
(45) Date of Patent: Nov. 26, 2019

(54) FOLDABLE MOBILE TERMINAL

(71) Applicant: Guangdong Oppo Mobile Telecommunications Corp., Ltd., Dongguan (CN)

(72) Inventor: YuGui Lin, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/555,560

(22) PCT Filed: Dec. 29, 2016

(86) PCT No.: PCT/CN2016/113045  
§ 371 (c)(1),  
(2) Date: Sep. 5, 2017

(87) PCT Pub. No.: WO2017/114468  
PCT Pub. Date: Jul. 6, 2017

(65) Prior Publication Data  
US 2018/0054501 A1 Feb. 22, 2018

(30) Foreign Application Priority Data  
Dec. 29, 2015 (CN) .......................... 2015 1 1026655

(51) Int. Cl.  
*H04M 1/00* (2006.01)  
*H04M 1/02* (2006.01)

(52) U.S. Cl.  
CPC ......... *H04M 1/0214* (2013.01); *H04M 1/021* (2013.01)

(58) Field of Classification Search  
CPC .. H04M 1/0214; H04M 1/022; H04M 1/0225; H04M 1/0231; H04M 1/0233  
(Continued)

(56) References Cited

U.S. PATENT DOCUMENTS 8,369,075 B2 * 2/2013 Huang .................. G09F 9/33  
                                                      248/297.21  
9,013,867 B2 * 4/2015 Becze .................. G06F 3/1438  
                                                      361/679.27  
(Continued)

FOREIGN PATENT DOCUMENTS

| CN | 203086539 | 7/2013 |
|---|---|---|
| CN | 203278901 | 11/2013 |

(Continued)

OTHER PUBLICATIONS

International Search Report and the Written Opinion dated Mar. 1, 2017 From the State Intellectual Property Office of the People's Republic of China Re. Application No. PCT/CN2016/113045 and Its Translation of Search Report Into English. (10 Pages).

(Continued)

*Primary Examiner* — April G Gonzales  
(74) *Attorney, Agent, or Firm* — Young Basile Hanlon & MacFarlane, P.C.

(57) ABSTRACT

A foldable mobile terminal includes a first main body, a second main body and a third main body. The first main body includes a frame and a body portion. The frame has an accommodating chamber in which the body portion is securely received. The second main body rotatably connects with the frame. The second main body is rotated relative to the frame to be received in the accommodating chamber. The third main body rotatably connects with the third main body. The third main body rotates relative to the second main body to be received in the accommodating chamber. A flexible screen is provided on the first, second and third main bodies. The second and third main bodies are shielded from viewing by the frame.

18 Claims, 4 Drawing Sheets

(58) Field of Classification Search
USPC .................................................... 455/575.3
See application file for complete search history.

(56) References Cited

U.S. PATENT DOCUMENTS

| | | | | |
|---|---|---|---|---|
| 9,179,559 | B1* | 11/2015 | Kim | G06F 1/1616 |
| 9,603,271 | B2* | 3/2017 | Lee | H05K 5/0017 |
| 9,612,621 | B2* | 4/2017 | Lee | G06F 1/1652 |
| 9,791,892 | B2* | 10/2017 | Park | G06F 1/1652 |
| 9,801,290 | B2* | 10/2017 | Ahn | H05K 5/0017 |
| 9,959,030 | B2* | 5/2018 | Sang | G06F 3/04817 |
| 2009/0275366 | A1 | 11/2009 | Schilling | |
| 2012/0264489 | A1* | 10/2012 | Choi | H04M 1/0216 |
| | | | | 455/566 |
| 2013/0010405 | A1* | 1/2013 | Rothkopf | H04M 1/0216 |
| | | | | 361/679.01 |
| 2014/0218321 | A1* | 8/2014 | Lee | G06F 1/1652 |
| | | | | 345/173 |
| 2016/0048165 | A1* | 2/2016 | Becze | G06F 3/1438 |
| | | | | 361/679.27 |
| 2016/0116943 | A1* | 4/2016 | Becze | G06F 3/1438 |
| | | | | 455/575.3 |

FOREIGN PATENT DOCUMENTS

| | | |
|---|---|---|
| CN | 203982278 | 12/2014 |
| CN | 104796504 | 7/2015 |
| CN | 104967713 | 10/2015 |
| CN | 105516411 | 4/2016 |
| EP | 2192750 A2 | 6/2010 |
| WO | WO 2017/114468 | 7/2017 |

OTHER PUBLICATIONS

Extended European search report issued in corresponding European application No. 16881257.6 dated Nov. 23, 2018.

* cited by examiner

FOLDABLE MOBILE TERMINAL

RELATED APPLICATIONS

This application is a National Phase of PCT Patent Application No. PCT/CN2016/113045 having International filing date of Dec. 29, 2016, which claims the benefit of priority of Chinese Patent Application No. 201511026655.7 filed Dec. 29, 2015. The contents of the above applications are all incorporated by reference as if fully set forth herein in their entirety.

FIELD AND BACKGROUND OF THE INVENTION

The present disclosure relates to the field of communication, and more particularly to a foldable mobile terminal.

Flexible screens, i.e., flexible display screens, have the characteristics of light weight, and being durable and bendable, which become the future development direction of industry of display screen. Thus, the following developing direction has always been for the research and development personnel in the industry to endeavor: how to combine a flexible display screen and an electronic device together to achieve a large-sized display screen, and, meanwhile, satisfy the effects of a compact structure in whole, a low volume, and a better portability.

Presently, taking a mobile phone as example, there already have been flexible screens applied on mobile phones to attain the objective for folding the mobile phone. The presently available mobile phone with flexible screen is usually divided into two parts. The two parts are pivotably connected together to achieve the objective that the mobile phone can be folded or unfolded.

However, by the above manner, the flexible screen can be folded once only. When it needs a large-sized flexible screen which needs to be folded many times, the above mentioned structure cannot satisfy. Besides, by the above manner, in the folded position, it can be apprehended that the two parts are separately provided as viewed from an appearance of the mobile phone, whereby a visual effect that the mobile phone is integral in the folded position cannot be obtained. Accordingly, a good experience of use of the mobile phone by the user can be adversely affected.

SUMMARY OF THE INVENTION

Based on the problems of the conventional technology as mentioned above, the present disclosure provides a foldable mobile terminal, which can be folded many times. After being folded, the folded lines cannot be observed from an appearance of the mobile terminal, whereby the aesthetical effect in whole of the mobile terminal is improved to enhance the user experience thereof.

To achieve the above objectives, the embodiments of the present disclosure provide the following technical solutions:

In an aspect, the present disclosure provides a foldable mobile terminal including a first main body, a second main body and a third main body. The first main body includes a frame and a body portion. The frame defines an accommodating chamber. The body portion is accommodated and secured in the accommodating chamber. The body portion includes a display surface and a rear surface. The display surface is provided to be oriented toward an upper surface of the frame. The second main body is pivotably connected to the frame. The second main body is pivoted relative to the frame to be received in the accommodating chamber. The second main body is superimposed on the rear surface of the body portion. The third main body is pivotably connected to the second main body. The third main body is pivoted relative to the second main body to be received in the accommodating chamber. The third main body is superimposed on a surface of the second main body facing away from the body portion.

In another aspect, the present disclosure also provides another foldable mobile terminal including a first main body and a second main body. The first main body includes a frame and a body portion. The frame defines an accommodating chamber. The body portion is received and secured in the accommodating chamber. The body portion includes a display surface and a rear surface. The display surface is provided to be oriented toward an upper surface of the frame. The second main body is pivotably connected to the frame. The second main body is rotated related to the frame to be received in the accommodating chamber. The second main body is superposed on the rear surface of the body portion.

BRIEF DESCRIPTION OF THE SEVERAL VIEWS OF THE DRAWINGS

In order to more clearly illustrate the embodiments of the present disclosure or the technical proposals of the present technology, a brief description of the drawings is given herebelow, wherein the drawings are required for describing the embodiments or the present technology. Apparently, the drawings of the following description are only related to some embodiments of the present disclosure. To a person of ordinary skill in the art, under the presumption that no creative endeavor is required, he/she can obtain other drawings according to the accompanied drawings.

DESCRIPTION OF SPECIFIC EMBODIMENTS OF THE INVENTION

Hereinafter, technical proposals of exemplary embodiments of the present disclosure will be described in a clear and detailed manner with reference to the accompanying drawings. Apparently, the embodiments disclosed herein are only a part of the embodiments of the present disclosure, rather than all embodiments thereof. Based on the embodiments of the present disclosure, all other embodiments obtained by a person of ordinal skill in the art under the presumption that they are made without creative endeavor are all within the scope of protection of the present disclosure.

Please refer to FIG. 1 to FIG. 4. A foldable mobile terminal 100 provided by an embodiment of the present disclosure includes a first main body 11, a second main body 12, a third main body 13 and a flexible screen 14 on surfaces of the first main body 11, the second main body 12 and the third main body 13. The first main body 11 includes a frame 11*a* and a body portion 11*b*. The frame 11*a* includes an accommodating chamber 11*c*. The body portion 11*b* is received and secured in the accommodating chamber 11c. The second main body 12 is pivitably connected to the frame 11a. When the second main body 12 is rotated relative to the frame 11a to be received in the accommodating chamber, a portion of the flexible screen which is located on the surface of the second main body 12 is moved to a location that the second main body 12 is located between the body portion 11b and the portion of the flexible screen which is located on the surface of the second main body 12. The third main body 13 is pivotably connected to the second main body 12. When the third main body 13 is rotated relative to the second main body 12 to be received in the accommodating chamber, a portion of the flexible screen which is located on the surface of the third main body 13 is moved to be located between the third main body 13 and the second main body 12.

In the embodiment of the present disclosure, the foldable mobile terminal 100 can be, but not limited to, a mobile terminal such as a mobile phone or a tablet computer. In accordance with the present embodiment, the foldable mobile terminal 100 is disclosed as a mobile phone, for example.

The frame 11a includes a first arm 111, a second arm 112 and a third arm 113. The first arm 111 is parallel to the third arm 113. The second arm 112 perpendicularly connects with the first and third arms 111, 113. The first arm 111, the second arm 112 and the third arm 113 cooperatively define the accommodating chamber 11c. In the present embodiment, the frame 11a has a substantially "U"-shaped configuration to facilitate the accommodation of the second main body 112 and the third main body 113 in the accommodating chamber 11c defined by the frame 11a, after rotations of the second and third main bodies. The first arm 111 defines a recess 111a in a surface thereof facing toward the third arm 113. The recess 111a can be used to receive a camera module assembly and a flash lamp. An external surface of the first arm 111 can be formed with a through hole at a position corresponding to the flash lamp whereby light generated by the flash lamp can project outwardly. Thus, the first main body 11 can achieve the function of photo taking. By adopting the design that the camera module assembly and the flash lamp are received in the first arm 111, it no longer needs to dispose a camera module assembly and a flash lamp in the body portion 11b of the first main body 11, thereby to lessen an occupying space by the body portion 11b and reduce a thickness thereof accordingly. In addition, correspondingly, in order to further decrease the occupying space by the body portion 11b, a recess 113a can be defined in a surface of the third arm 113 facing toward the first arm 111. A microphone and a speaker can be received in the recess 113a. The third arm 113 then just needs to be provided with corresponding speaker holes in its external surface.

The body portion 11b is securely received in the accommodating chamber of the frame 11a. In the present embodiment, the body portion 11b is fixed in the accommodating chamber defined by the first arm 111, the second arm 112 and the third arm 113. The body portion 11b includes a display surface 114 and a rear surface 115. The display surface 114 is provided facing toward an upper surface of the frame 11a. In other words, the display surface 114 is provided facing toward upper surfaces of the first arm 111, the second arm 112 and the third arm 113. A portion of the flexible screen 14 positioned on the body portion 11b has an upper surface which is leveled with the upper surfaces of the first arm 111, the second arm 112 and the third arm 113, thereby to enable a user to view and use the flexible screen 14 easily. More specifically, the body portion 11b is adhered to the first arm 111, the second arm 112 and the third arm 113 whereby the body portion 11b can be securely received in the accommodating chamber. It can be understood that in other embodiments, the body portion 11b can be formed with protrusions or grooves and the first main body 111, the second main body 112 and the third main body 113 can be formed with mating grooves or protrusions to engage with the protrusions or grooves of the body portion thereby fixing the body portion 11b in the accommodating chamber.

Furthermore, a circuit board 11d and a battery in electrical connection with the circuit board 11d are provided within the body portion 11b. The camera module assembly within the first arm 111 is electrically connected with the circuit board 11d. The microphone or speaker within the third arm 113 is electrically connected with the circuit board 11d.

In the present embodiment, the second main body 12 includes an enclosure 121, a circuit board 121a provided within the enclosure 121 and a battery provided within the enclosure 121. The battery is electrically connected with the circuit board 121a.

Figure 3:
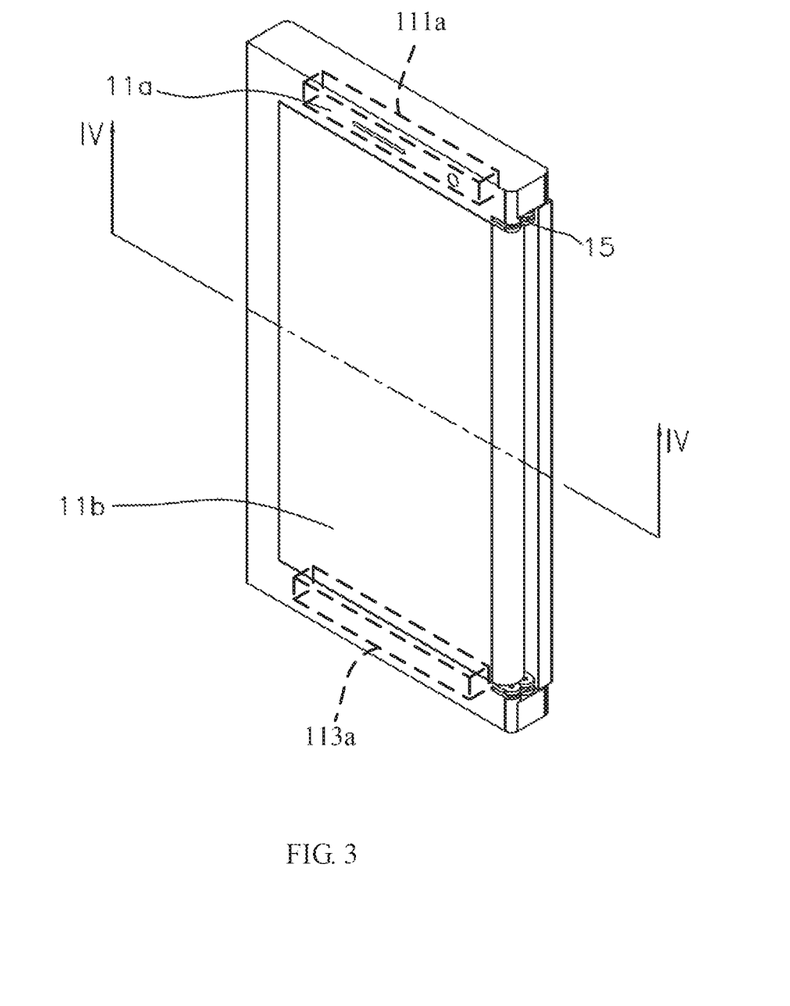
FIG. 3 illustrates a diagrammatic view of the foldable mobile terminal provided by the embodiment of the present disclosure which is in a folded position.
Figure 4:
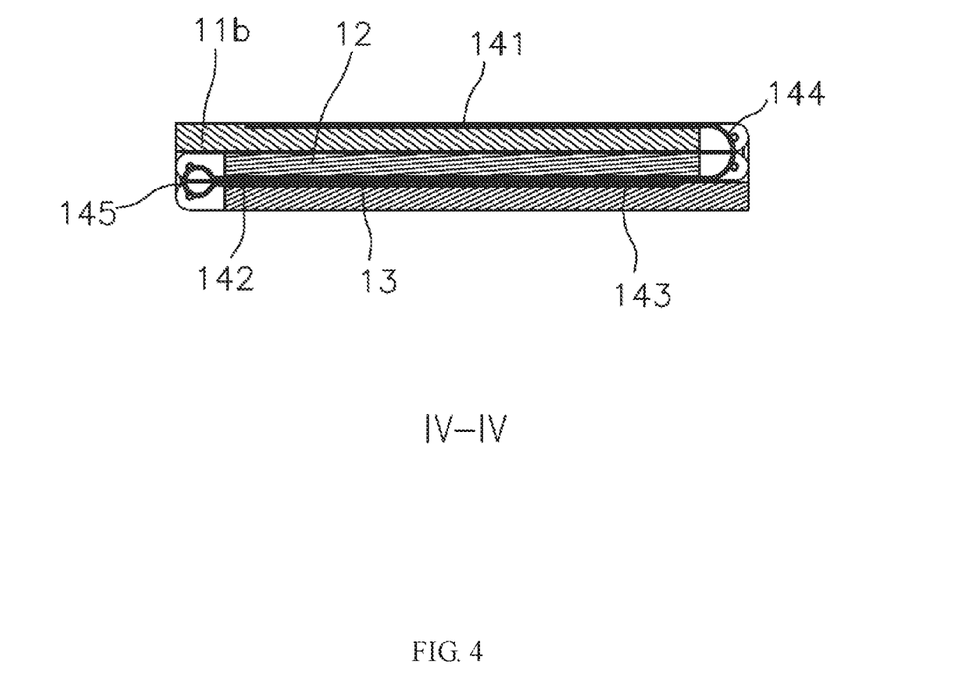
FIG. 4 illustrates a cross-sectional view taken along line IV-IV of FIG. 3.

The second main body 12 is pivotably connected to the frame 11a. An opening/closing angle between the second main body 12 and the frame 11a is between 0 degrees and 180 degrees. Thus, the second main body 12 can be rotated relative to the frame 11a to be received in the accommodating chamber; or the second main body 12 can be rotated relative to the frame 11a to be disposed unfoldedly. Specifically, the second main body is rotatably connected to the first arm 111 and the third arm 113. Two ends of the second main body 12 are rotatably connected with the first arm 111 and the third arm 113, respectively. As shown in FIGS. 3 and 4, when the opening/closing angle between the second main body 12 and the frame 11a is 0 degrees, the second may body 12 is rotated relative to the first arm 111 and the third arm 113 to be received in the accommodating chamber. At this time, the second main body 12 is superposed on the rear surface 115 of the body portion 11b. Since the second main body 12 is received in the accommodating chamber, when viewed by the user from front, only the body portion 11b of the first main body 11 is visible. The second main body 12 is not visible, whereby the visual effect that the mobile terminal only includes the first main body 11 and has a thinner thickness can be obtained.

Figure 1:
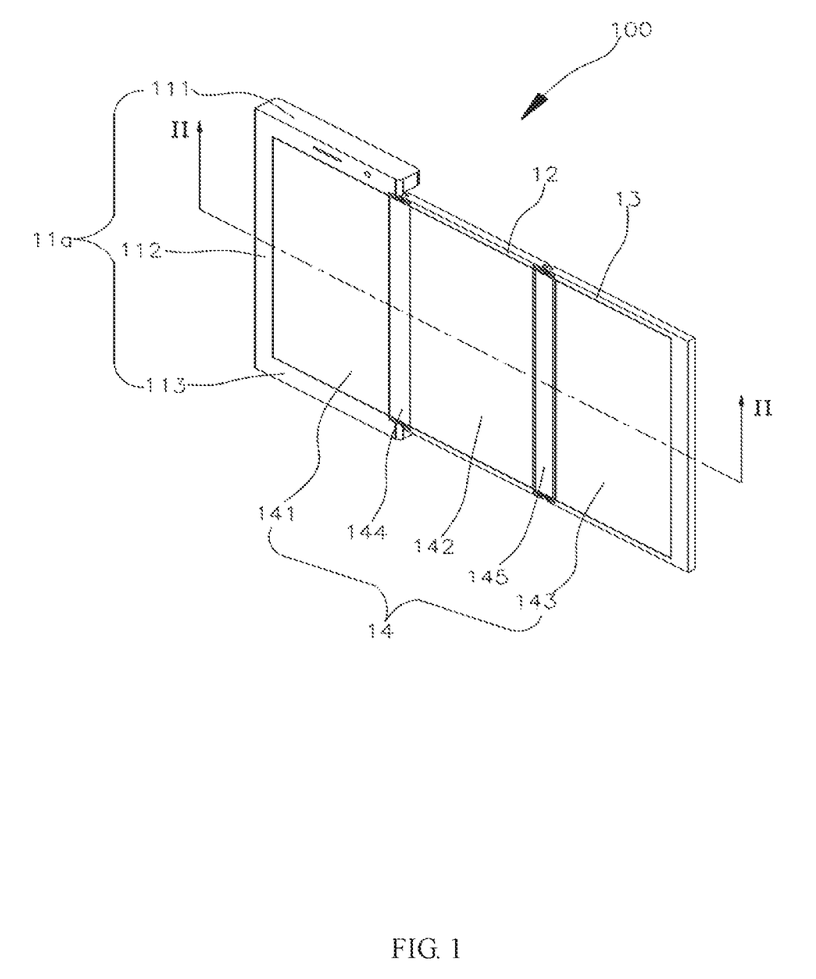
FIG. 1 illustrates a diagrammatic view of a foldable mobile terminal provided by an embodiment of the present disclosure which is in an extended position.
Figure 2:
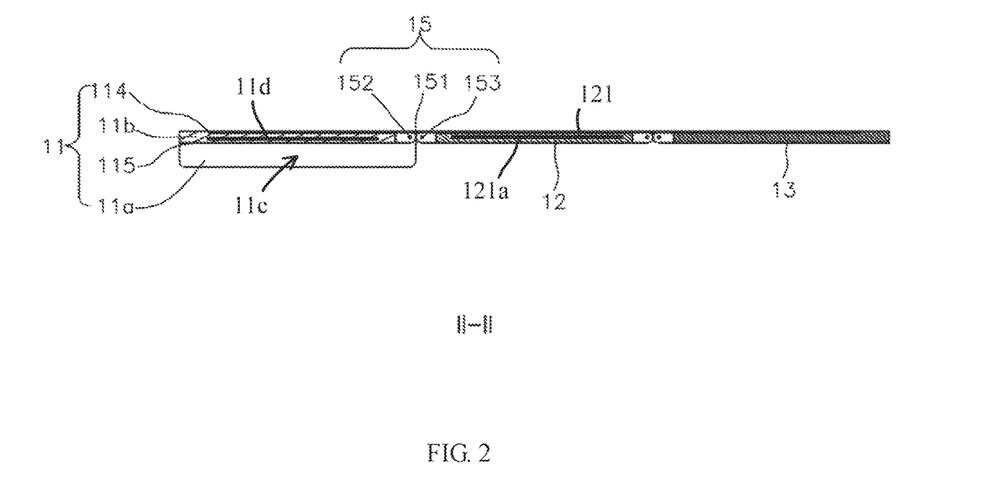
FIG. 2 illustrates a cross-sectional view taken along line II-II of FIG. 1.

As shown in FIG. 1 and FIG. 2, when the opening/closing angle between the second main body 12 and the frame 11a is 180 degrees, the upper surface of the second main body 12 is coplanar with the upper surface of the body portion 11a of the first main body 11. The flexible screen 14 exhibits a disposition of being extended. The user can obtain a visual experience of a display of a larger size through the extended disposition of the flexible screen 14.

Furthermore, the second main body 12 rotatably connects with the frame 11a via a pivot assembly 15. The pivot assembly 15 includes a thin plate 151, a first axle 152 and a second axle 153. Each of the first arm 111 and second main body 12 is formed with a snapping cavity (not shown). Two ends of the thin plate 151 are snapped into the snapping cavities. The first axle 152 extends through the first arm 111 and a corresponding end of the thin plate 151. The second axle 153 extends through the second main body 12 and the other end of the thin plate 151 to achieve the rotation of the second main body 12 relative to the first arm 111. Preferably, there are two pivot assemblies 15, one of which is provided between the first arm 111 and the second main body 12, and the other is provided between the third arm 113 and the second main body 12, thereby to achieve the rotation of the second main body 12 relative to the first arm 111 and the third arm 113.

In the present embodiment, when the second main body 12 rotates relative to the frame 11a to be received in the accommodating chamber, in order to make the second main body 12 to be superposed on the rear surface of the body portion 11b to prevent the second main body 12 from escaping from the accommodating chamber, the first arm 111 can be provided with a fastener. The second main body 12 can be provided with a fastening recess corresponding to the fastener. When the second main body 12 is received in the accommodating chamber, the fastener is snapped into the fastening recess thereby to achieve the objective of preventing the second main body 12 from sliding from the accommodating chamber. Alternatively, the first arm 111 can be provided with a fastening recess and the second main body 12 is provided with a fastener corresponding to the fastening recess. By utilizing the snapping action between the fastening recess and the fastener, the second main body 12 and the first arm 111 can be snappingly connected together. When it needs to extend the second main body 12 relative to the first arm 111, the only requirement is to separate the snapping connection between the fastening recess/fastener of the second main body 12 and the fastener/fastening recess of the first arm 111.

It can be understood that in other embodiments, the first arm 111 and the third arm 113 can be further provided with magnetic components thereon, such as magnets. Then the second main body 12 is also provided with magnetic components thereon at corresponding positions. For example, the second main body 12 is also provided with magnets. The polarity of the magnets on the second main body 12 is opposite to the polarity of the magnets on the first arm 111 and the third arm 113. When the second main body 12 is rotated relative to the first arm 111 and the third arm 113 to be received in the accommodating chamber, the magnets on the second main body 12 attract the magnets on the first arm 111 and he third arm 113, thereby to also achieve the objective, i.e., preventing the second main body 12 from sliding out of the accommodating chamber. In the present embodiment, the third main body 13 has a structure which is the same as the structure of the second main body 12. Therefore, a detailed description of the third main body 13 can be referred to the description of the structure of the second main body 12 and is no longer repeated here.

The third main body 13 pivotably connects with an end of the second main body 12 distant from the frame 11a. The third main body 13 and the second main body 12 have an opening/closing angle of 0 degrees to 180 degrees therebetween, thereby to enable the main body 13 to rotate relative to the second main body 12 to be received in the accommodating chamber, or enable the third main body 13 to be extended relative to the second main body 12. In the present embodiment, when the third main body 13 is rotated relative to the second main body 12 to be received in the accommodating chamber, the third main body 13 is superposed on the rear surface of the second main body 12. Furthermore, in order to prevent the third main body 13 from sliding out of the accommodating chamber, the second main body 12 is provided with a fastener thereon, and the third main body 13 defines a fastening recess corresponding to the fastener of the second main body 12. When the third main body 13 rotates relative to the second main body 12 to be received in the accommodating chamber, the third main body 13 snappingly connects with the second main body 12. Alternatively, the second main body 12 defines a fastening recess. The third main body 13 is provided with a fastener thereon, corresponding to the fastening recess of the second main body 12. The fastener snappingly engages in the fastening recess. It can be understood that in other embodiments the third main body 13 and the second main body 12 can also attract each other by the provision of magnetic components thereon, thereby to enable the third main body 13 to be superposed on the rear surface of the second main body 12 and prevent the third main body 13 from escaping from the accommodating chamber.

The third main body 13 is rotatably connected to the second main body 12 through the pivot assembly 15. In the present embodiment, the pivot assembly 15 has a structure the same as that disclosed above, which is not repeated here.

Furthermore, when the second main body 12 is rotated relative to the frame 11 a to be received in the accommodating chamber and the third main body 13 is rotated relative to the second main body 12 to be received in the accommodating chamber, as viewed from the front by the user, since the second main body 12 and the third main body 13 both are received in the accommodating chamber, the user can only see the body portion 11b of the first main body 11; thus, the user can have a visual effect of the mobile terminal as a common, monolithic slat-like mobile phone. When the second main body 12 is unfolded relative to the frame 11a and meanwhile the third main body 13 is unfolded relative to the second main body 12, as viewed from the front, the user can simultaneously see the body portion 11b of the first main body 11, the second main body 12 and the third main body 13. Since the flexible screen 14 simultaneously covers the upper surfaces of the body portion 11b, the second main body 12 and the third main body 13, the user can obtain a watching experience of the largest-sized display screen. Through the rotations of the second main body 12 and the third main body 13, the mobile terminal can achieve the twice folding and the twice unfolding to satisfy the user's different requirements. Thus, the user experience can be enhanced greatly.

In the present embodiment, the flexible screen 14 is consisted of a flexible display screen on which a flexible touch screen is stacked, thereby to achieve the display effect and the touch control effect. Specifically, the flexible touch screen and the flexible display screen are glued together through optical adhesive. Thus, when the flexible touch screen and the flexible display screen are connected together, the display effect of the flexible display screen will not be affected. Preferably, the optical adhesive is OCA (optical clear adhesive) optical adhesive.

The flexible screen 14 includes a first part 141, a second part 142 and a third part 143 which are positioned on the upper surfaces of the body portion 11b, the second main body 12 and the third main body 13, respectively. A first bendable region 144 is formed between the second part 142 and the first part 141. A second bendable region 145 is formed between the third part 143 and the second part 142. More specifically, as shown in FIG. 4, when the second main body 12 is rotated relative to the frame 11a to be received in the accommodating chamber, the second part 142 is moved to a location that the second main body 12 is located between the body portion 11b and the second part 142. The first bendable region 144 is bent to have an arc-shaped configuration. When the third main body 13 is rotated relative to the second main body 12 to be received in the accommodating chamber, the third part 143 is moved to be located between the third main body 13 and the second main body 12. The second bendable region 145 is bent to have an arc-shaped configuration. As shown in FIG. 1, when the second main body 12 is unfolded relative to the frame 11a, and the third main body 13 is unfolded relative to the third main body, the first bendable region 144 and the second bendable region 145 each exhibit a status of being unfolded. Through the unfolding or bending of the first bendable region 144 and the second bendable region 145, the bending or unfolding effect of the flexible screen 14 can be achieved, thereby to attain the folding effect or large-sized display effect of the foldable mobile terminal 100.

The mobile terminal provided by the present disclosure includes a first main body which includes a frame and a body portion wherein the body portion is secured in the frame. A second main body is then provided to be pivotably connected to the frame of the first main body. The second main body can be rotated relative to the frame to be received in the accommodating chamber. That is, the second body can be folded to be received in the accommodating chamber. In the same time, the third main body is provided to pivotably connect with the second main body to achieve the twice folding. The third main body can rotate relative to the second main body to be received in the accommodating chamber. Thus, the when the second main body is rotated to be received in the accommodating chamber and the third main body is rotated to be received in the accommodating chamber, by the shielding effect provided by the frame of the first main body, the folded positions cannot be observed from an external appearance of the mobile terminal, thereby satisfying the integral requirement of the mobile terminal by the user. Thus the user experience can be enhanced.

In the description of the specification, reference terminologies "an embodiment", "some embodiments", "an example", "a specific example", "some examples", or the similar "first embodiment" mean that specific features, structures, materials, or characteristics in conjunction with the description of the embodiments or examples are included in at least one of the embodiments or examples. In the specification, the illustrated description of the above-mentioned terminologies is not limited to the same embodiment or example. Moreover, the described specific features, structures, materials, or characteristics may be combined in a proper way in any one or more of the embodiments or examples.

The embodiments as disclosed above should not be construed as a limitation of the technical proposals of the present disclosure. Various changes, modifications, equivalents, and variants to the idea and principles of the above disclosed embodiments should be included within the protected scope of the technical proposals of the present disclosure.

What is claimed is:

1. A foldable mobile terminal, comprising:
   a first main body comprising a frame and a body portion, the frame defining an accommodating chamber able to receive the body portion, a second main body, and a third main body, the body portion having a display surface and a rear surface opposite the display surface, the display surface being aligned with an upper surface of the frame;
   the second main body pivotably connected to the frame, the second main body being rotatable relative to the frame to be superposed on the rear surface of the body portion and received in the accommodating chamber;
   the third main body pivotably connected to the second main body, the third main body being rotatable relative to the second main body to be superposed on a surface of the second main body away from the body portion and received in the accommodating chamber;
   a flexible screen provided on surfaces of the first main body, the second main body and the third main body, wherein when the second main body is rotated relative to the first main body to be received in the accommodating chamber, a portion of the flexible screen on the surface of the second main body is moved to a location that the second main body is located between the body portion of the first main body and the portion of the flexible screen on the surface of the second main body, wherein when the second main body is rotated relative to the first main body to be received in the accommodating chamber and the third main body is rotated relative to the second main body to be received in the accommodating chamber, a portion of the flexible screen on the surface of the third main body is moved to be located between the third main body and the second main body.

2. The foldable mobile terminal of claim 1, wherein the second main body is further rotatable relative to the frame to be unfolded with respect to the frame.

3. The foldable mobile terminal of claim 1, wherein the third main body is further rotatable relative to the second main body to be unfolded with respect to the second main body.

4. The foldable mobile terminal of claim 1, wherein:
   the frame comprises a first arm, a second arm and a third arm, wherein the first arm is parallel to the third arm, the second arm is perpendicularly connected to the first arm and the third arm, and the first arm, the second arm and the third arm cooperatively define the accommodating chamber.

5. The foldable mobile terminal of claim 4, wherein:
   when the second main body is received in the accommodating chamber, the second main body is snappingly connected to the first arm;
   when the third main body is received in the accommodating chamber, the third main body is snappingly connected to the second main body.

6. The foldable mobile terminal of claim 4, wherein:
   the first arm is provided with a camera module assembly therein;
   the body portion is provided with a circuit board and a battery therein, wherein the battery is electrically coupled with the circuit board, and the camera module assembly is electrically coupled with the circuit board.

7. The foldable mobile terminal of claim 4, wherein:
   the second main body is pivotally connected to the frame via a first pivot assembly;
   the third main body is pivotally connected to the second main body via a second pivot assembly.

8. The foldable mobile terminal of claim 7, wherein:
   the first pivot assembly and the second pivot assembly have the same structure and each comprise a thin plate, a first axle and a second axle;
   the first arm and the second main body are both provided with a snapping recess;
   the thin plate has two ends snapped in the snapping recesses of the first arm and the second main body, respectively;
   the first axle extends through the first arm and one of the two ends of the thin plate; and
   the second axle extends through the second main body and the other one of the two ends of the thin plate.

9. The foldable mobile terminal of claim 1, wherein:
   the flexible screen comprises a first part, a second part and a third part, wherein the first part, the second part and the third part are disposed on upper surfaces of the body portion, the second main body and the third main body, respectively, the first part and the second part cooperatively define a first bendable region, and the second part and the third part cooperatively define a second bendable region;

when the second main body is rotated relative to the frame to be received in the accommodating chamber, and the third main body is rotated relative to the second main body to be received in the accommodating chamber, the second part is moved to a location that the second main body is located between the body portion and the second part, and the third part is moved to be located between the third main body and the second main body, the first bendable region and the second bendable region each are bent to have an arc-shaped configuration.

10. The foldable mobile terminal of claim 1, wherein:
the second main body comprises an enclosure;
the foldable mobile terminal further comprises a circuit board and a battery, wherein the circuit board and the battery are both disposed within the enclosure, and the battery is electrically coupled with the circuit board.

11. A foldable mobile terminal, comprising:
a first main body comprising a frame and a body portion, the frame defining an accommodating chamber able to receive the body portion and a second main body, the body portion having a display surface and a rear surface opposite the rear surface, the display surface being aligned with an upper surface of the frame;
the second main body pivotably connected with the frame, the second main body being rotatable relative to the frame to be received in the accommodating chamber and superposed on the rear surface of the body portion;
a flexible screen disposed on surfaces of the first main body and the second main body, wherein when the second body is rotated relative to the first main body to be received in the accommodating chamber, a portion of the flexible screen on the surface of the second main body is moved to a location that the second main body is located between the body portion of the first main body and the portion of the flexible screen on the surface of the second main body.

12. The foldable mobile terminal of claim 11, wherein:
the frame comprises a first arm, a second arm and a third arm, wherein the second arm is perpendicularly connected to the first arm and the third arm, and the first arm, the second arm and the third arm cooperatively define the accommodating chamber.

13. The foldable mobile terminal of claim 12, wherein the body portion is secured in the accommodating chamber via snapping connections.

14. The foldable mobile terminal of claim 12, wherein:
the first arm and the third arm each are provided with a first magnetic component thereon;
the second main body is provided with a second magnetic component able to be attracted by the first magnetic component.

15. The foldable mobile terminal of claim 12, wherein when the second main body is received in the accommodating chamber, the second main body is snappingly connected to the first arm.

16. The foldable mobile terminal of claim 11, wherein a part of the flexible screen on the body portion is aligned with upper surfaces of the first arm, the second arm and third arm.

17. The foldable mobile terminal of claim 11, wherein the flexible screen comprises a flexible touch screen and a flexible display screen attached to the flexible touch screen through optical adhesive.

18. The foldable mobile terminal of claim 11, wherein when the second main body is unfolded relative to the frame, the upper surface of the second main body is aligned with the upper surface of the body portion.

* * * * *